United States Patent [19]

Corbin, Sr.

[11] 4,414,258
[45] Nov. 8, 1983

[54] TURN-UP TAPE

[76] Inventor: James R. Corbin, Sr., P.O. Box 789, Millbrook, Ala. 36054

[21] Appl. No.: 309,063

[22] Filed: Oct. 6, 1981

[51] Int. Cl.³ .............................................. B32B 7/00
[52] U.S. Cl. ...................................... 428/193; 242/64; 242/74; 428/40; 428/192; 428/194; 428/196; 428/233; 428/236; 428/257; 428/258; 428/343; 428/354; 428/914; 428/916
[58] Field of Search ............... 428/258, 122, 343, 124, 428/40, 192, 193, 194, 196, 198, 233, 236, 257, 343, 354, 914, 916; 242/74, 64

[56] References Cited

U.S. PATENT DOCUMENTS

| 3,252,484 | 5/1966 | Meyer et al. | 428/258 |
| 3,599,888 | 8/1971 | Coudriet et al. | 156/174 |
| 4,339,089 | 7/1982 | Dobbins | 242/64 |

*Primary Examiner*—Marion McCamish
*Assistant Examiner*—E. Rollins Buffalow
*Attorney, Agent, or Firm*—Kenyon & Kenyon

[57] ABSTRACT

The turn-up tape is made entirely of a repulpable material. The ribbon of the tape is made of brown paper warp strips and twisted paper filaments. The tape can be wound on spools and provided with cards at spaced intervals in order to dispense individual lengths of the tape.

10 Claims, 5 Drawing Figures

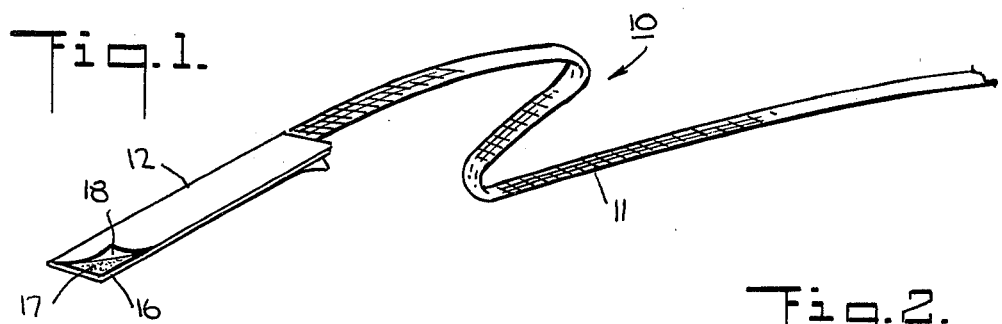
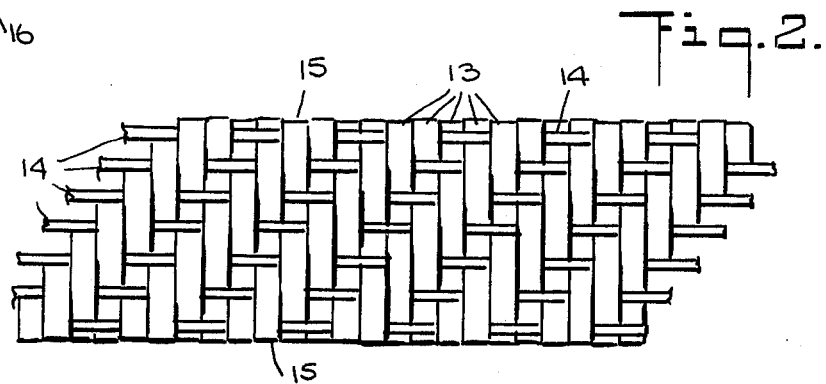
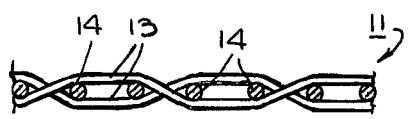
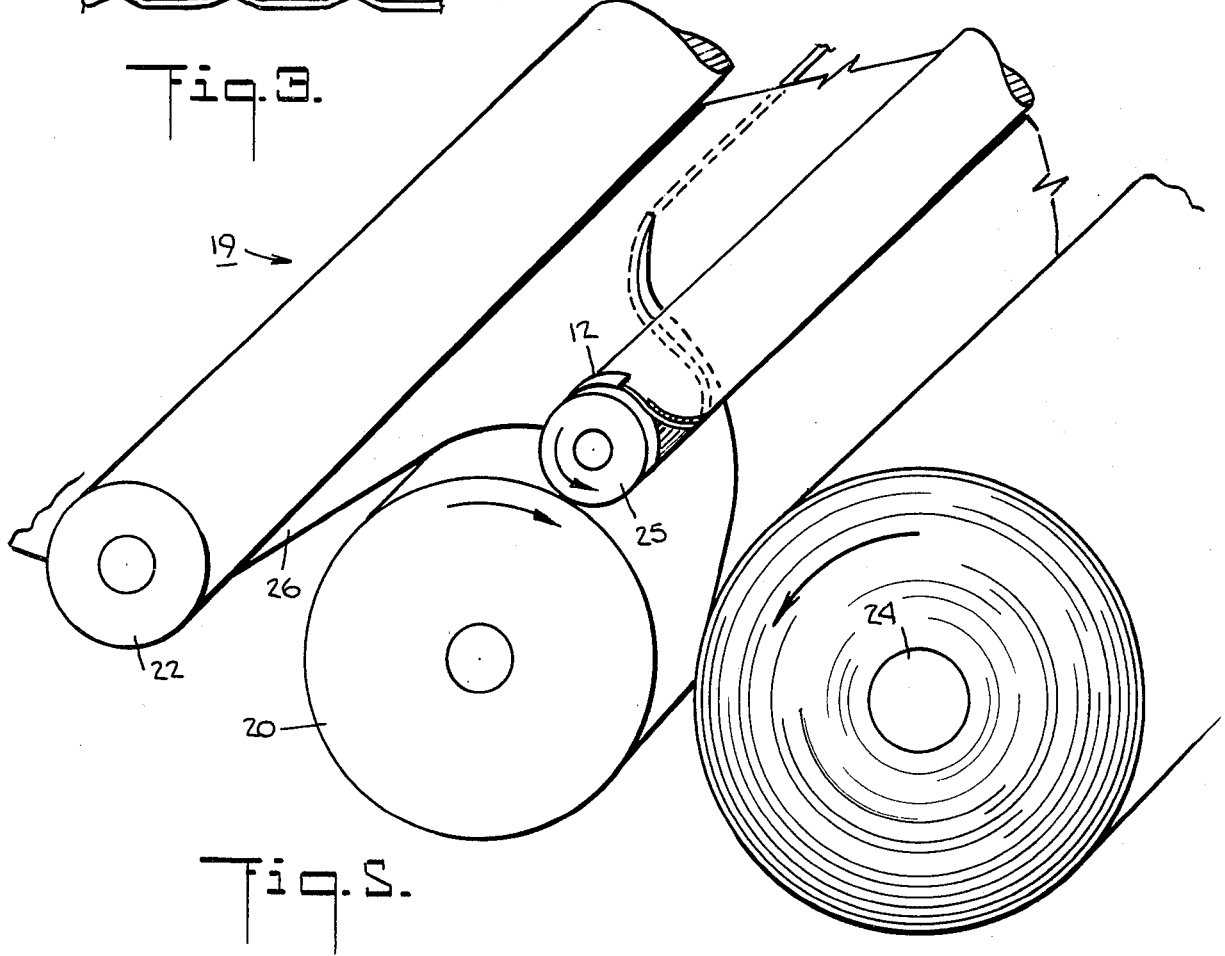

TURN-UP TAPE

This invention relates to a turn-up tape. More particularly, this invention relates to a paper turn-up tape severing a travelling web of paper.

Heretofore, it has been known in the winding of a travelling web of material, such as paper, onto rotating reel spools to sever the web at each reel spool becomes full and to initiate winding on an empty reel spool. In the past, various techniques have been used to perform this dual step operation. For example, use has been made of a strip of adhesive tape which is applied across and under the full width of a travelling web at an angle. In this case, the leading end of the tape projects beyond the edge of the web so as to adhere to an empty spool as the web is moved through a nip formed in part by the empty spool. Once the tape adheres to the empty spool, the trailing part of the tape begins to wind on the empty spool while severing the web to finish a wound spool. At the same time, the tape-adhered severed edge is wound on the empty spool to initiate a new roll. Such a technique is described in U.S. Pat. No. 3,599,888.

Other techniques have employed polyester or synthetic take-up tapes which are disposed under the path of a travelling web and which can be manually inserted at one end into a nip between a reel drum and an empty reel spool in order to effect severing of a web. In this case, the inserted end of the tape is provided with an adhesive means so as to adhere to the empty reel spool. Hence, upon rotation of the empty reel spool, the tape winds about the spool while severing the travelling web and holding the leading edge of the freshly cut web against the empty spool.

However, the use of a polyester or synthetic tape creates various problems in an overall papermaking process, particularly in pulping apparatus. For example, mechanical and operational problems are created, such as sealing over of extraction plates, wrapping about impellers and shafts, plugging of pumps, unnecessary wear on equipment, plugging screens and cleaners and causing web breaks on the machines. All of these create undue and expensive additional expense.

Accordingly, it is an object of the invention to provide a take-up tape which is repulpable.

It is another object of the invention to provide a turn-up tape which can be readily used in severing a travelling web of material such as paper and linerboard.

It is another object of the invention to provide a turn-up tape which can be customized to length.

Briefly, the invention provides a turn-up tape for severing a travelling web, for example of paper or linerboard, which utilizes a paper ribbon. In this regard, the paper ribbon is formed of paper warp strips and paper weft filaments which are disposed in woven relation to each other and which is made entirely of repulpable material. In addition, the ribbon is formed so that a pair of longitudinal cutting edges are provided for severing a travelling web.

The turn-up tape also has means secured at one end of the ribbon for attaching the ribbon to a rotating reel spool. For example, this means may include a card which is folded over the end of the tape and which is provided with a pair of adhesive surfaces. In addition, a release layer, for example of waxed paper, is disposed over the card to cover the adhesive surfaces until such are ready to be used.

The tape may be provided in pre-prepared lengths or in a continuous wound form with a plurality of cards at spaced apart intervals. In the latter case, a spool containing a relatively long length of tape may be mounted and placed beneath the path of a travelling web of paper so that shorter lengths can be withdrawn and severed from the spool for use in cutting the web from time to time.

These and other objects and advantages of the invention will become more apparent from the following detailed description taken in conjunction with the accompanying drawings wherein:

FIG. 1 illustrates a section of turn-up tape constructed in accordance with the invention;

FIG. 2 illustrates an enlarged top view of the ribbon of the take-up tape in accordance with the invention;

FIG. 3 illustrates a view taken on line 3—3 of FIG. 2;

FIG. 5 illustrates a further view of the spooling machine in a position after severing of a web has been initiated.

Figure 4:
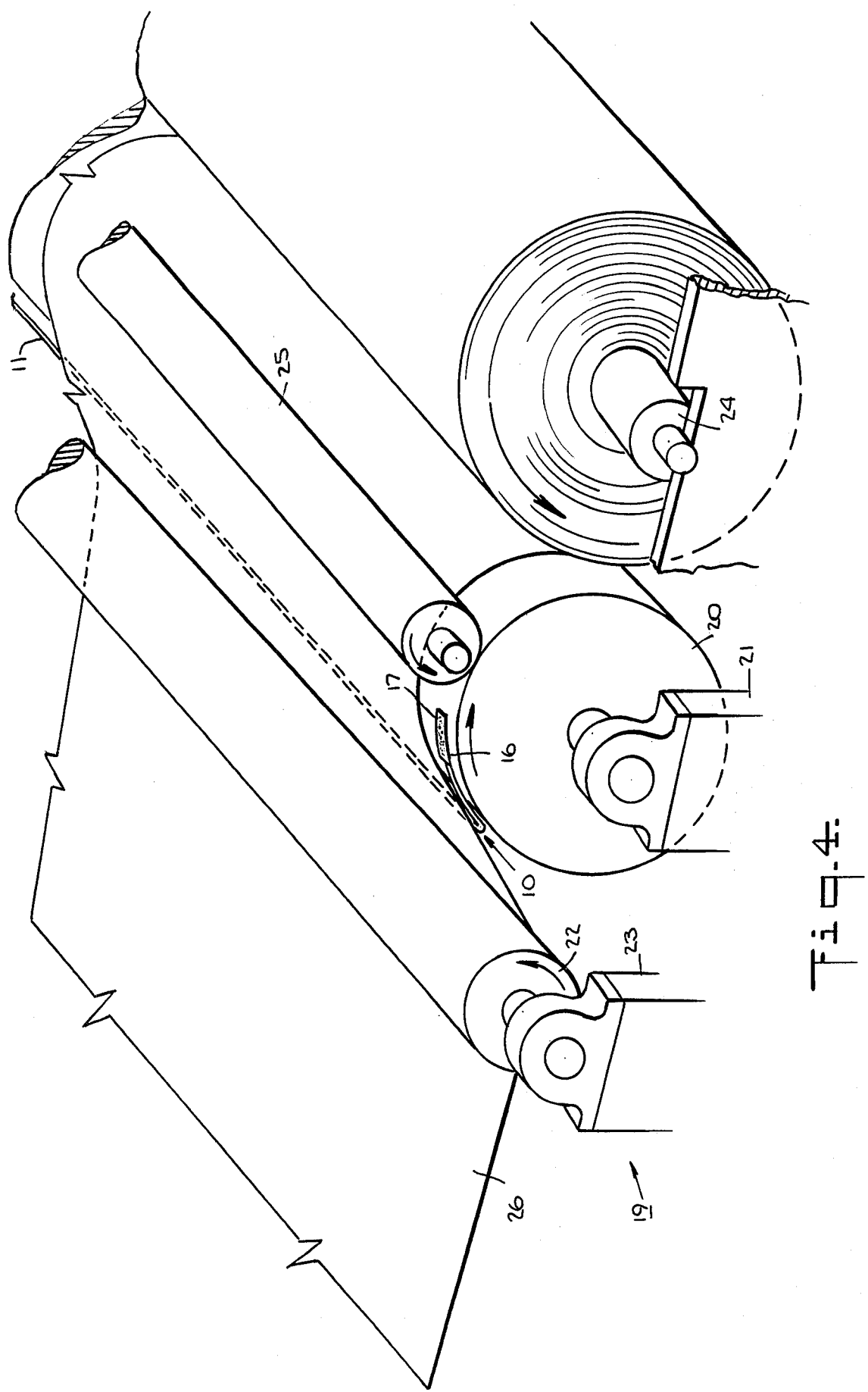
FIG. 4 illustrates a view of a spooling machine employing the turn-up tape according to the invention.

Referring to FIG. 1, the turn-up tape 10 is comprised of a paper ribbon 11 and means 12 secured at one end of the ribbon 11 for attaching the ribbon 11 to a rotating reel spool (not shown).

As shown in FIGS. 2 and 3, the paper ribbon 11 is comprised of a plurality of flat warp strips 13 and weft filaments 14 disposed in woven relation to each other. In this regard, the warp strips 13 are made of brown paper while the weft filaments 14 are made as twisted paper. The weaving of the warp strips 13 and weft filaments 14 into a ribbon can be performed in any suitable fashion. For example, a continuous web may be woven of continuous warp strips and weft filaments and subsequently severed transversely, for example, into widths of one inch. Alternatively, the ribbon 11 can be made in a manner to provide lengths of, for example, between twenty-one feet and fifty-six feet or more, unlimited.

In addition, the warp strips 13 and filaments 14 can be held together by a suitable adhesive which is applied to the ribbon 11. In any event, the ribbon 11 is made so as to have a pair of longitudinal cutting edges 15 which are sufficiently stiff and sharp to sever a travelling web of paper or linerboard.

Referring to FIG. 1, the means 12 which is secured at the end of the ribbon 11 is formed of a card 16 which is folded over the end of the ribbon 11 and which has a pair of exposed adhesive surfaces 17. This card 16 can be applied to the end of the ribbon 11 in any suitable manner. For example, the facing surfaces of the card 16 which are folded over may be provided with a glue or other adhesive to fix the faces to each other and to the ribbon 11. In addition, a release layer 18 is folded over the card 16 in order to cover the adhesive surfaces 17 until the tape 10 is to be utilized. This release layer 18 is made of any suitable material which can be manually stripped from card 16 when the tape 10 is to be utilized, for example waxed paper.

Referring to FIG. 4, the turn-up tape 10 can be readily utilized with a spooling machine 19 in which a series of spools are to be wound. For example, as shown, the spooling machine 19 employs a reel drum 20 which is rotatably mounted on suitable supports 21 (only one of which is shown), a lead-in or tension roll 22 which is also rotatably mounted on suitable supports 23 (only one of which is shown) and a plurality of reel spools 24, 25 which are mounted in suitable manner so as to be moved about the reel drum 20 to provide for a sequential winding of the spools. Any suitable means (not shown) may be used for this purpose. As indicated, a travelling web of material 26, such as paper, is fed into the spooling machine 19 to be wound onto the respective spools 24, 25.

During operation, after a spool 24 has been wound to a full condition and an empty spool 25 is to be wound, the take-up tape 10 is positioned under the travelling web 26 at a location between the reel drum 20 and tension roll 22. In this regard, the ribbon 11 lies beneath the web 26 and is attached to a braking device at one end (not shown) with the attaching means 12, i.e., the card 16 at the opposite end. At this time, the release layer (not shown) is removed from the side of the card 16 which is to adhere to the empty spool 24. The card 16 is then inserted into the nip between the empty spool 25 and the reel drum 20 at a point beyond the edge of the web 26 so as to attach to the face of the empty reel spool 25. Once the card has attached to the spool 25, which is in rotating motion, the tape 10 will spiral the length of the spool 25 (see FIG. 5). The braking device (not shown) will hold the tape 10 for the duration of time necessary for the tape 10 to travel the entire length of the spool 25.

The spool 25 being above the web 26, draws or leads the ribbon 11 through the web 26 cuting the web 26 and holding the in-feeding edge of the web 26 against the spool 25 causing the web 26 to wrap about the spool 25. This operation is otherwise known and no further description is believed to be necessary.

It is to be noted that the length of the ribbon 11 may vary depending upon the machine with which the tape 10 is used. That is, the length of the tape 10 is determined by the width of the spooling machine, type of braking device used, method of inserting the card 16 into the nip and obstacles that the tape 10 may have to be routed around. For example, at the present time, the shortest requirement for the length of the tape 10 is about twenty-one feet while the longest requirement is about fifty-six feet. In any event, the tape 10 can be made up in the exact length required. Alternatively, the tape can be made with a ribbon which is continuously wound with a plurality of cards at spaced-apart intervals. In this case, the tape can be pulled off a spool with a card already attached and can be cut off at the following card.

Since the turn-up tape 10 is made entirely of repulpable material, i.e., paper, the tape 10 can be readily utilized in pulping equipment. In this regard, the flat paper strips 13 and twisted paper filaments 14 of the tape 10 may be readily separated and comminuted during a pulping operation. Thus, long strands which might otherwise wind about an impeller or cause clogging of a screen can be eliminated.

What is claimed is:

1. A turn-up tape for severing a travelling web of paper comprising
a repulpable paper ribbon having at least one cutting edge for severing a travelling web of paper; and
means secured to one end of said ribbon for attaching said ribbon end to a rotating reel spool, said means having at least one adhesive layer and a release layer covering said adhesive layer.

2. A tape as set forth in claim 1 wherein said ribbon is woven.

3. A tape as set forth in claim 2 wherein said ribbon is woven of paper warp strips and twisted paper weft filaments.

4. A tape as set forth in claim 2 wherein said means is a card folded over said end of said ribbon and having a pair of said adhesive surfaces thereon and which further comprises a release layer folded over said card to cover each said adhesive surface.

5. A tape as set forth in claim 1 wherein said ribbon is continuously wound and has a plurality of said cards at spaced apart intervals.

6. A turn-up tape for severing a travelling web of paper comprising
a repulpable paper ribbon having paper warp strips and paper weft filaments disposed in woven relation to each other to define at least one cutting edge for severing a travelling web of paper; and
a card secured to one end of said ribbon, said card having at least one adhesive layer for attaching said ribbon end to a rotating reel spool and a release layer covering said adhesive layer.

7. A tape as set forth in claim 6 wherein said ribbon is continuously wound and has a plurality of said cards at spaced apart intervals.

8. A paper ribbon as set forth in claim 6 wherein said filaments are twisted.

9. A paper ribbon as set forth in claim 6 wherein said strips and filaments are adhesively secured together.

10. A paper ribbon as set forth in claim 6 having a pair of longitudinal cutting edges.

* * * * *

UNITED STATES PATENT AND TRADEMARK OFFICE
CERTIFICATE OF CORRECTION

PATENT NO. : 4,414,258
DATED : November 8, 1983
INVENTOR(S) : JACOB R. CORBIN, SR.

It is certified that error appears in the above—identified patent and that said Letters Patent is hereby corrected as shown below:

In the Title page, change "James R. Corbin, Sr." to --Jacob R. Corbin, Sr.--

Column 3, line 18, change "24" to --25--

Column 3, line 29, change "cuting" to --cutting--

Signed and Sealed this

Twenty-fourth Day of January 1984

[SEAL]

Attest:

GERALD J. MOSSINGHOFF

*Attesting Officer*          *Commissioner of Patents and Trademarks*